(12) United States Patent
Honkanen et al.

(10) Patent No.: US 10,576,820 B2
(45) Date of Patent: Mar. 3, 2020

(54) WHEEL HUB UNIT

(71) Applicant: VOLVO CONSTRUCTION EQUIPMENT AB, Eskilstuna (SE)

(72) Inventors: Arto Honkanen, Eskilstuna (SE); Thomas Andersson, Eskilstuna (SE); Mats Akerblom, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 16/061,347

(22) PCT Filed: Dec. 22, 2015

(86) PCT No.: PCT/SE2015/051388

§ 371 (c)(1),
(2) Date: Jun. 12, 2018

(87) PCT Pub. No.: WO2017/111674

PCT Pub. Date: Jun. 29, 2017

(65) Prior Publication Data

US 2018/0361849 A1      Dec. 20, 2018

(51) Int. Cl.
*B60K 17/04*      (2006.01)
*F16C 33/58*      (2006.01)
(Continued)

(52) U.S. Cl.
CPC .......... *B60K 17/046* (2013.01); *F16C 19/166* (2013.01); *F16C 19/18* (2013.01);
(Continued)

(58) Field of Classification Search
None
See application file for complete search history.

(56) References Cited

U.S. PATENT DOCUMENTS 714,612 A * 11/1902 Rochester .......... B60B 27/0005
384/544
3,583,511 A * 6/1971 Asberg ................ B60B 27/0005
180/370
(Continued)

FOREIGN PATENT DOCUMENTS

DE      10062315 A1      7/2002
EP      1719656 A1      11/2006
(Continued)

OTHER PUBLICATIONS

International Search Report (dated Sep. 2, 2016) for corresponding International App. PCT/SE2015/051388.
(Continued)

*Primary Examiner* — Justin Holmes
(74) *Attorney, Agent, or Firm* — Sage Patent Group

(57) ABSTRACT

A wheel hub unit is provided including at least one planetary gear set, including a sun gear, one set of planet gears, a carrier, and a ring gear, wherein each of the planet gears of the set of planet gears is provided with an engagement arrangement adapted for engagement with a corresponding engagement arrangement of the ring gear, wherein the engagement is provided at an engagement area in which the engagement arrangement of the planet gears overlap the engagement arrangement of the ring gear, a bearing, including an inner bearing ring, an outer bearing ring and rolling elements, wherein the inner bearing ring constitutes the ring gear of the planetary gear set, and wherein a center of each of the respective rolling elements is axially displaced in relation to the engagement area. A vehicle including such a wheel hub unit is also provided.

14 Claims, 4 Drawing Sheets

(51) Int. Cl.
  *F16C 19/16* (2006.01)
  *F16C 19/18* (2006.01)
  *B60K 7/00* (2006.01)

(52) U.S. Cl.
  CPC .............. *F16C 33/581* (2013.01); *B60K 7/00* (2013.01); *B60K 7/0007* (2013.01); *B60Y 2200/415* (2013.01); *F16C 2326/02* (2013.01)

(56) References Cited

U.S. PATENT DOCUMENTS

| | | | |
|---|---|---|---|
| 3,737,000 A * | 6/1973 | Knobloch | B60K 17/046 |
| | | | 180/369 |
| 4,930,590 A | 6/1990 | Love et al. | |
| 5,397,281 A | 3/1995 | Forster | |
| 5,679,087 A | 10/1997 | Lutz | |
| 5,685,798 A | 11/1997 | Lutz et al. | |
| 7,118,182 B2 * | 10/2006 | Kayama | B60B 27/00 |
| | | | 301/105.1 |
| 7,530,416 B2 | 5/2009 | Suzuki | |
| 2006/0215948 A1* | 9/2006 | Bosco | B60B 27/00 |
| | | | 384/544 |
| 2013/0217529 A1* | 8/2013 | Gunji | B60K 7/0007 |
| | | | 475/1 |
| 2015/0110427 A1* | 4/2015 | Berens | F16C 33/588 |
| | | | 384/446 |
| 2016/0016431 A1* | 1/2016 | Norimatsu | B60B 27/0005 |
| | | | 384/544 |
| 2017/0120676 A1* | 5/2017 | Chung | B60B 35/125 |

FOREIGN PATENT DOCUMENTS

| | | |
|---|---|---|
| EP | 1899619 A1 | 3/2008 |
| EP | 1899619 B1 | 6/2013 |
| EP | 2740625 A1 | 6/2014 |
| WO | WO 03/039900 A1 | 5/2003 |
| WO | 2007001220 A1 | 1/2007 |
| WO | WO 2007/001220 A1 | 1/2007 |
| WO | 2008069707 A1 | 6/2008 |
| WO | 2015141387 A1 | 9/2015 |

OTHER PUBLICATIONS

Extended European Search Report for European Application EP 15 911 462.8, dated Aug. 21, 2019, 6 Pages.

* cited by examiner

WHEEL HUB UNIT

BACKGROUND AND SUMMARY

The present invention relates to a wheel hub unit for a vehicle. The present invention also relates to a vehicle being provided with a wheel hub unit.

The invention is applicable on working machines within the fields of industrial construction machines or construction equipment; in particular wheel loaders and articulated haulers. Although the invention will be described with respect to a wheel loader, the invention is not restricted to this particular vehicle, but may also be used in other working machines, such as excavators and backhoe loaders. It may also be used in e.g. trucks, buses or cars.

Vehicles, for example wheel loaders, today are often provided with a final drive comprising a hub-mounted reduction gear. The hub-mounted reduction gear can be provided in the form of a hub unit and is provided in the wheel which is intended to be driven. The wheel hub unit may typically comprise at least one planetary gear set with an integral brake, and a bearing. The sun gear of the planetary gear set is rotationally locked to and driven by a drive shaft connected to the vehicle's drive source. The sun gear is in engagement with, and drives, planet gears which are arranged between the sun gear and a ring gear. The bearing is provided between the stationary ring gear of the planetary gear set and the rim. The planet carrier is fixedly connected to the rim, and thereby drives the wheel. An example of such a wheel hub unit is provided in EP 1 899 619.

There is a general desire in the industry to develop the drive systems of the vehicles, including i.a. the wheel hub units. The wheel hub units may be improved e.g. by adding further reduction gears or by adding electric motors to them, thereby enabling electric or hybrid drive of the vehicle. However, the size of the rim is usually fixed for the specific type of vehicle, and the wheel hub unit should preferably be able to fit in the rim. If portions of the wheel hub unit extend outside the rim, there is a risk that the ground clearance of the vehicle is compromised.

It is desirable to provide a wheel hub unit which may contain more and/or larger components, as compared to the prior art, and still fit into a rim of a specific size.

The wheel hub unit according to the present invention comprises at least one planetary gear set, comprising a sun gear, one set of planet gears, a carrier, and a ring gear, wherein each of the planet gears of the set of planet gears is provided with engagement means adapted for engagement with corresponding engagement means of the ring gear, and wherein said engagement is provided at an engagement area where said engagement means of the planet gears overlap said engagement means of the ring gear. The wheel hub unit also comprises a bearing, comprising an inner bearing ring, an outer bearing ring and rolling elements. The inner bearing ring constitutes the ring gear of the planetary gear set, wherein a center of each of the respective rolling elements is axially displaced in relation to said engagement area.

With axially displaced is meant to understand that a straight radially extending imaginary line which intersects an axial center line of the wheel hub unit perpendiculary and intersects the center of one of said rolling elements is axially displaced in relation to a straight radially extending imaginary line which intersects the axial center line of the wheel hub unit perpendiculary and intersects the portion of the engagement area that is closest to said rolling element. As is also understood, the imaginary lines that extend perpendicularly from the axial center of the wheel hub unit, and intersect the center of a rolling element of a bearing and the engagement area of the planetary gear set, respectively, are parallel with each other.

By axially displacing the rolling elements of the bearing and the engagement area where said engagement means of the planet gears overlap said engagement means of the ring gear engagement, the available space along the axial length of the wheel hub unit is better utilized, and the radial limitation is thereby to at least some extent handled. A benefit of axially displacing these two parts of the wheel hub unit is that the ring gear/inner bearing ring require a certain material thickness in order to reliably fulfill it tasks. It is therefore usually not acceptable to reduce the material thickness in order to make it fit within the constraints of a rim of a specific size. Reducing the material thickness may also not always be enough in order to fit a planetary gear set of a desired size radially inwards of a bearing. By the inventive axial displacement, the required material thickness may be achieved within the specified size constraints and the planetary gear set may be made larger and still be able to be used within a rim of a specific size. According to this first aspect, it is not required that there is no axial overlap between the rolling elements and the engagement area. Instead, it is only required that the portion of the engagement area being closest to the rolling elements is displaced in the axial direction in relation to the center of the rolling elements.

According to one exemplary embodiment, the rolling elements are axially displaced in relation to the engagement area of the planet gear engagement means and the ring gear engagement means, such that the entire rolling elements are arranged axially outside of the engagement area.

Hence, in this embodiment, a straight imaginary line that intersects the axial center line of the wheel hub unit perpendicularly and intersects one of said rolling elements at the portion of the rolling element being closest to the engagement area is axially displaced in relation to a straight radially extending imaginary line which intersects the axial center line of the wheel hub unit perpendicularly and intersects the portion of the engagement area that is closest to said rolling element.

Hence, according to this aspect of the present invention, the engagement area is ax tally distanced in relation to the rolling elements of the bearing, such that no axial overlap is present between the engagement area and the rolling elements of the bearing. By that, it is possible to provide for a ring gear/inner bearing ring having an even larger material thickness as compared to the first embodiment of the present invention. It may even be conceivable with a planetary gear set in which the root diameter of die ring gear is larger than the diameter of the raceway of the inner bearing ring. Hence, a larger planetary gear set may be provided within a rim of a specific size.

According to one exemplary embodiment, the bearing is a double-row bearing. According to this exemplary embodiment, the rolling elements of the double-row bearing are axially displaced in relation to the engagement area of the planet gear engagement means and the ring gear engagement means, such that both rolling elements in each pair of rolling elements are arranged axially outside of the engagement area.

Hence, a straight imaginary line that intersects the axial center line of the wheel hub unit perpendicularly and intersects a rolling element in the row of rolling elements that is closest to the engagement area is axially displaced in relation to a straight radially extending imaginary line which intersects the axial center line of the wheel hub unit perpendicularly and intersects the portion of the engagement area that is closest to said rolling element. Hence, according to this embodiment, the engagement area is axially displaced in relation the rolling elements being closest to the engagement means. As for the embodiment described above, a configuration according to this embodiment allows for the possibility to provide a larger planetary gear set.

According to an exemplary embodiment, the engagement means of the planet gears are provided in the form of teeth. According to one exemplary embodiment, corresponding teeth are provided on an inward facing surface of the ring gear, as seen in the radial direction of the wheel hub unit.

According to one exemplary embodiment, the wheel hub unit has an axial extension with an inner end being the end that is adapted to be connected to a vehicle, and an outer end being the end that is adapted to be connected to a rim for holding a wheel.

According to one exemplary embodiment, said inner bearing ring comprises a flange which extends in the axial direction of said wheel hub unit, and wherein the engagement means of the ring gear are provided on said flange. Providing the engagement means of the ring gear on a flange extending in the axial direction of the wheel hub unit is a beneficial way of axially distancing the engagement area from the rolling elements of the bearing.

According to one exemplary embodiment, the engagement area is provided closer to the outer end than said rolling elements of the bearing, as seen in the axial direction of the wheel hub unit. Hence, the engagement area is provided further axially away from where the wheel hub unit is connected to the vehicle body, as compared to where the rolling elements are provided. They do however not extend outside the outermost portion of the rim or the wheel when the wheel hub unit is fitted to a rim. In order to provide for a vehicle with good ground clearance, it is beneficial to provide all parts of the wheel hub unit within the rim or wheel.

According to one exemplary embodiment, the inner ring of the bearing is a split inner ring comprising two parts. A split inner ring comprises at least two parts that are connected through a suitable connecting element. Such a connecting element may e.g. be a bolt or screw. Providing the inner ring of the bearing as a split inner ring is beneficial in terms of simplified production whiles it at the same time provides for a sufficiently strong and robust bearing ring.

According to one exemplary embodiment, both parts of the split inner bearing ring are in contact with the rolling elements of the bearing. In other words, the bearing race is provided in a space defined by both parts of the inner bearing ring.

According to one exemplary embodiment, a first pan of the two parts of the split inner bearing ring constitutes the ring gear of the planetary gear set. Hence, the engagement means of the ring gear is provided on only one of the parts of split inner bearing ring.

According to one exemplary embodiment, said first part of the split inner bearing ring is provided closer to the outer end of the wheel hub unit than said other pan of the split inner bearing ring, as seen in the axial direction of the wheel hub unit. It is beneficial to provide the engagement means at the outer pan of the split inner bearing ring as the engagement means are intended to be in meshed engagement with the engagement means of the planetary gear set.

According to one exemplary embodiment, said wheel hub unit comprises a drive shaft, which extends along at least a portion of the axial center line of said wheel hub unit. The drive shaft may beneficially be connected to a drive source, such as e.g. an electrical motor, a hydraulic drive or an ICE.

According to one exemplary embodiment, said drive shaft is, directly or indirectly, drivingly connected to the sun gear of said at least one planetary gear set.

According to one exemplary embodiment, said wheel hub unit further comprises an electric machine as a drive source for driving the sun gear.

According to one exemplary embodiment, said wheel hub unit comprises at least two planetary gear sets coupled in series between the electric machine and the wheel hub. According to one exemplary embodiment, the wheel hub unit is provided with a gear shifting device. According to one exemplary embodiment, the gear shifting device comprises at least one further planetary gear set, and said gear shifting device is adapted for connecting and disconnecting, respectively, the planet gears of said one further planetary gear set from being driving) y connected to an electric machine. The present invention may be especially beneficial when more components, such as further planetary gear sets and an electric machine shall be fitted in the wheel hub unit.

According to one exemplary embodiment, said wheel hub unit comprises at least two planetary gear sets coupled in series, wherein one of said at least two planetary gear sets constitutes said at least one planetary gear set. Hence, it is not necessary that the engagement areas of all planetary gear sets of a wheel hub unit are axially displaced in relation to the rolling elements of a bearing of a wheel hub unit. The purpose of the present invention may well be achieved if the engagement areas of one of two or more planetary gear sets are axially displaced in relation to die rolling elements of the bearing.

According to one exemplary embodiment, the planetary gear set having the largest diameter of the at least two planetary gear sets constitutes said at least one planetary gear set. According to this exemplary embodiment, when the wheel hub unit comprises more than one planetary gear set, it is the planetary gear set with the largest diameter whose engagement areas are axially displaced in relation to the rolling element of the bearing. With diameter is meant to understand the diameter of the ring gear of the planetary gear set. As the purpose of the present invention is to provide for a wheel hub unit which may contain more and/or larger components and still fit into a rim of a specific size, the invention may be more beneficial if it is the planetary gear set with the largest diameter that is axially displaced. Hence, one planetary gear set having a smaller diameter may be provided at the same axial position as the bearing and there may still be sufficient material thickness for the ring gear/inner bearing ring.

According to one exemplary embodiment, a root diameter of the ring gear is in the range of 95-110% of an inner raceway diameter of the inner bearing ring. By axially displacing the engagement area of the engagement means of the ring gear and engagement means of the planet gears and the rolling elements of the bearing, it is possible to provide for a larger planetary gear set than what was possible with the prior art. Therefore, it is possible to provide for a wheel hub unit in which the ring gear has a root diameter which is 95% or more of the diameter of the inner raceway of the bearing. In other words, the diameter of the ring gear as measured at the bottom of the gears may be 95% or more of the distance between the radially innermost parts of two rolling elements of the bearing being positioned opposite each other. By the axial displacement, it is even possible to provide planetary gear sets having a larger diameter, for example up to 110%, than the diameter of the bearing, even though the inner bearing ring constitutes the ring gear.

According to one exemplary embodiment, a root diameter of the ring gear is in the range of 95-100% of an inner raceway diameter of the inner bearing ring. According to this exemplary embodiment, the root diameter of the ring gear is at most the same as the inner raceway diameter of the inner bearing ring. It is however larger than what would have been possible if the planet gears and the rolling elements had not been axially displaced in relation to each other, as a certain material thickness is required for the inner bearing ring/ring gear.

The vehicle according to the second aspect of the present invention comprises a wheel hub unit according to the first aspect of the present invention. The wheel hub unit according to the first aspect of the present invention may be beneficial to use in a work machine, or in a truck, a bus or a car.

According to one exemplary embodiment, said vehicle is a work machine, such as a wheel loader.

According to one exemplary embodiment, said wheel hub unit is provided in a rim of said vehicle, and wherein the rolling elements of the bearing are closer to a center of the rim, as seen in the width direction of said rim, than the engagement area. It is beneficial, in terms of bearing load and torque subjected to the bearing and thereby the expected life length of the bearing, to provide the bearing center close to the axial center of the rim that the wheel hub unit is connected to. It is therefore more beneficial to displace the engagement area along the axial direction of the rim.

BRIEF DESCRIPTION OF THE DRAWINGS

The above, as well as additional features and advantages of the present invention will be better understood through the following illustrative and non-limiting detailed description of exemplary embodiments of the present invention, with reference to the appended drawings, wherein.

DETAILED DESCRIPTION

Figure 1:
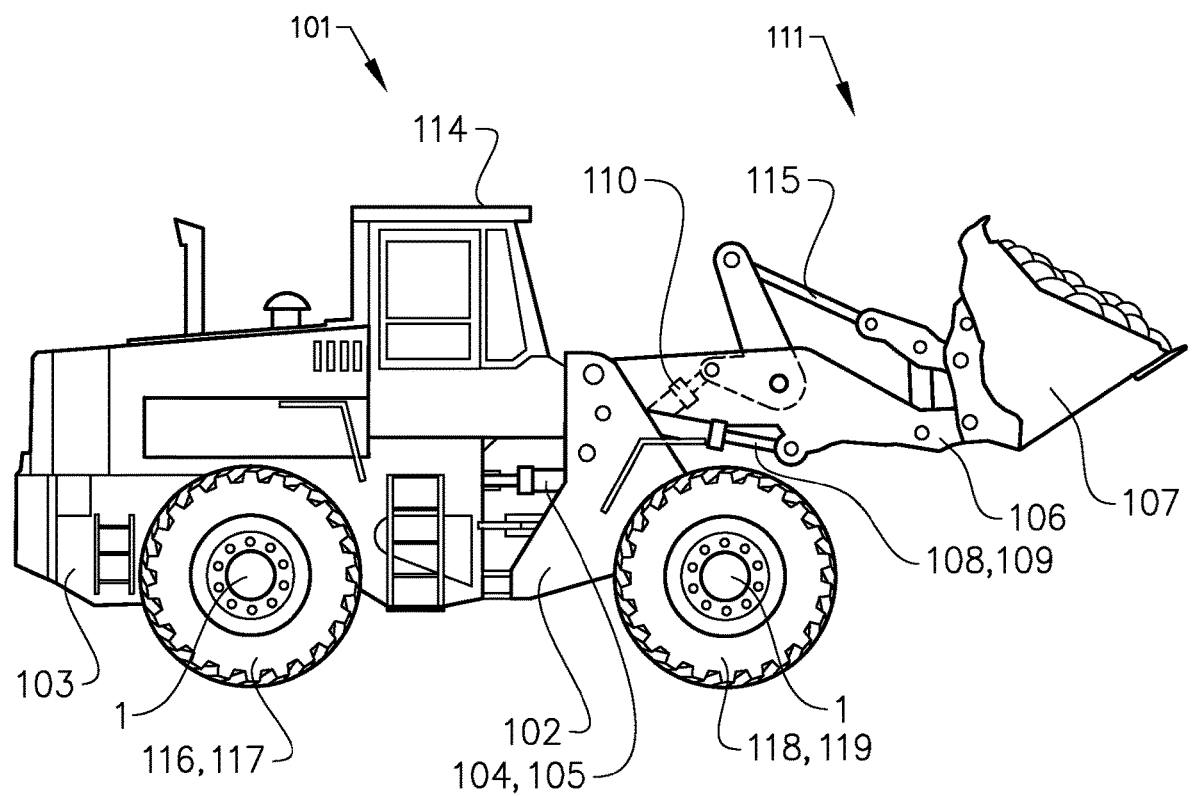
FIG. 1 shows a side view of a wheel loader.

The present invention will now be described more fully hereinafter with reference to the accompanying drawings, in which exemplary embodiments of the invention are shown. The invention may, however, lie embodied in many different forms and should not be construed as limited to the embodiments set forth herein; rather, these embodiments are provided for thoroughness and completeness, and fully convey the scope of the invention to the skilled addressee. Like reference characters refer to like elements throughout the description.

FIG. 1 shows a wheel loader 101. The body of the wheel loader 101 comprises a front section 102 and a rear section 103, which each has a pair of wheels 116, 117, 118, 119, of which only one wheel in each pair is shown in FIG. 1. Each of the wheels 116, 117, 118, 119 is connected to, and driven by, a wheel hub unit 1. The wheel hub unit 1 will be described in greater detail below and in connection with FIGS. 2-4. The rear section 103 comprises a cab 114. The vehicle sections 102, 103 are arranged to rotate in relation to one another about a vertical axis with the aid of two first actuators in the form of hydraulic cylinders 104, 105 arranged between the two sections. The hydraulic cylinders 104, 105 are arranged on either side of a horizontal center line through the vehicle for the purpose of steering the vehicle.

The wheel loader 101 comprises a device 111 for moving objects or material. The device 111 comprises a load arm unit 106 and an implement 107 in the form of a bucket, which is arranged on the load arm unit 106. A first end of the load arm unit 106 is rotatably connected to the front vehicle section 102. The implement 107 is rotatably connected to a second end of the load arm unit 106.

The load arm unit 106 can be raised and lowered in relation to the front section 102 of the vehicle by means of two other actuators in the form of two hydraulic cylinders 108, 109, which are each connected to by one end to the from vehicle section 102 and by the other end to the load arm unit 106. The bucket 107 can be tilted in relation to the load arm unit 106 by means of a third actuator in the form of a hydraulic cylinder 110, which is connected by a first end to the front vehicle section 102 and by its second end to the bucket 107 via a linkage arm system 115.

Figure 2A:
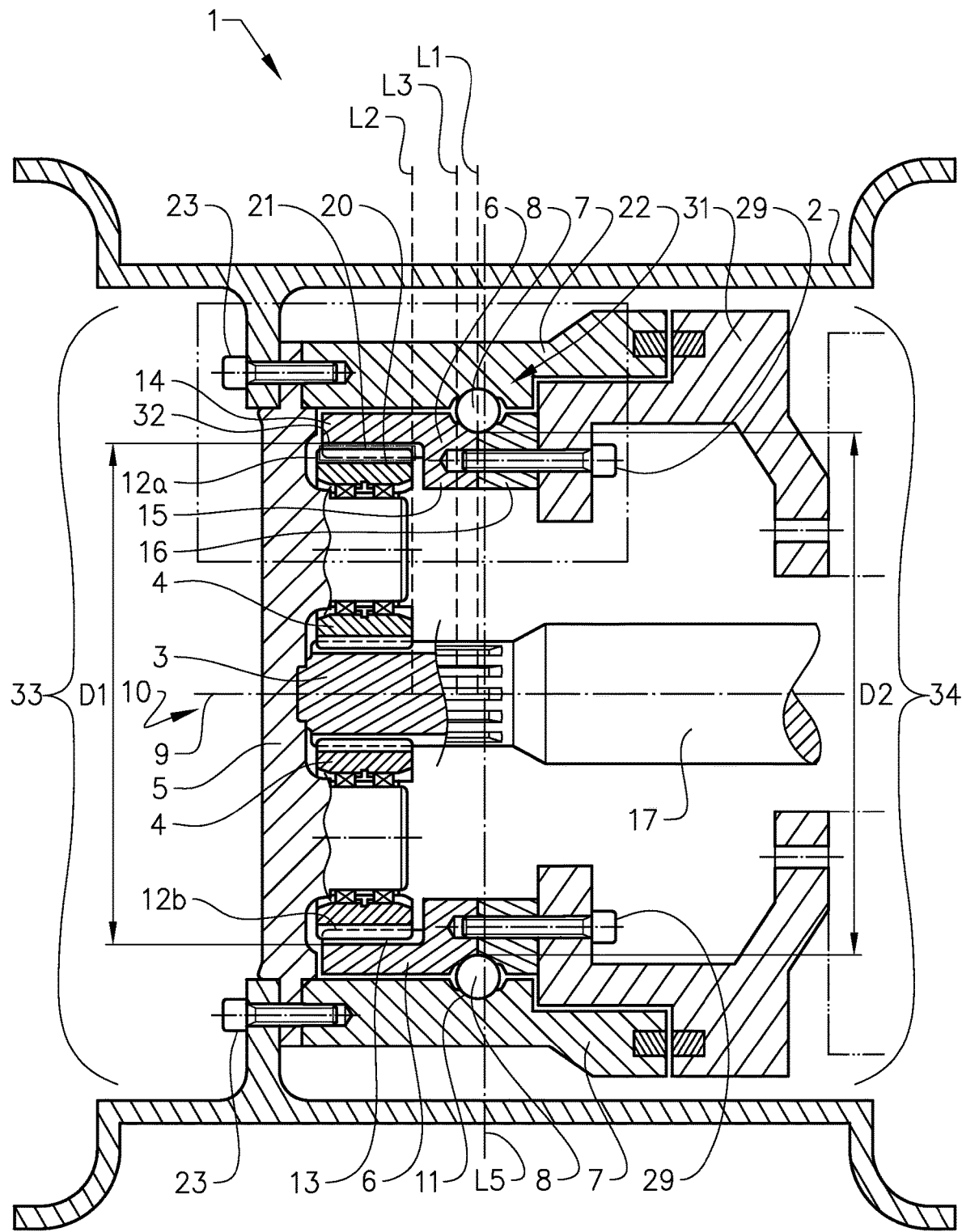
FIG. 2a shows a cut-away cross-sectional view of a wheel hub unit according to a first embodiment of the present invention.
Figure 2B:
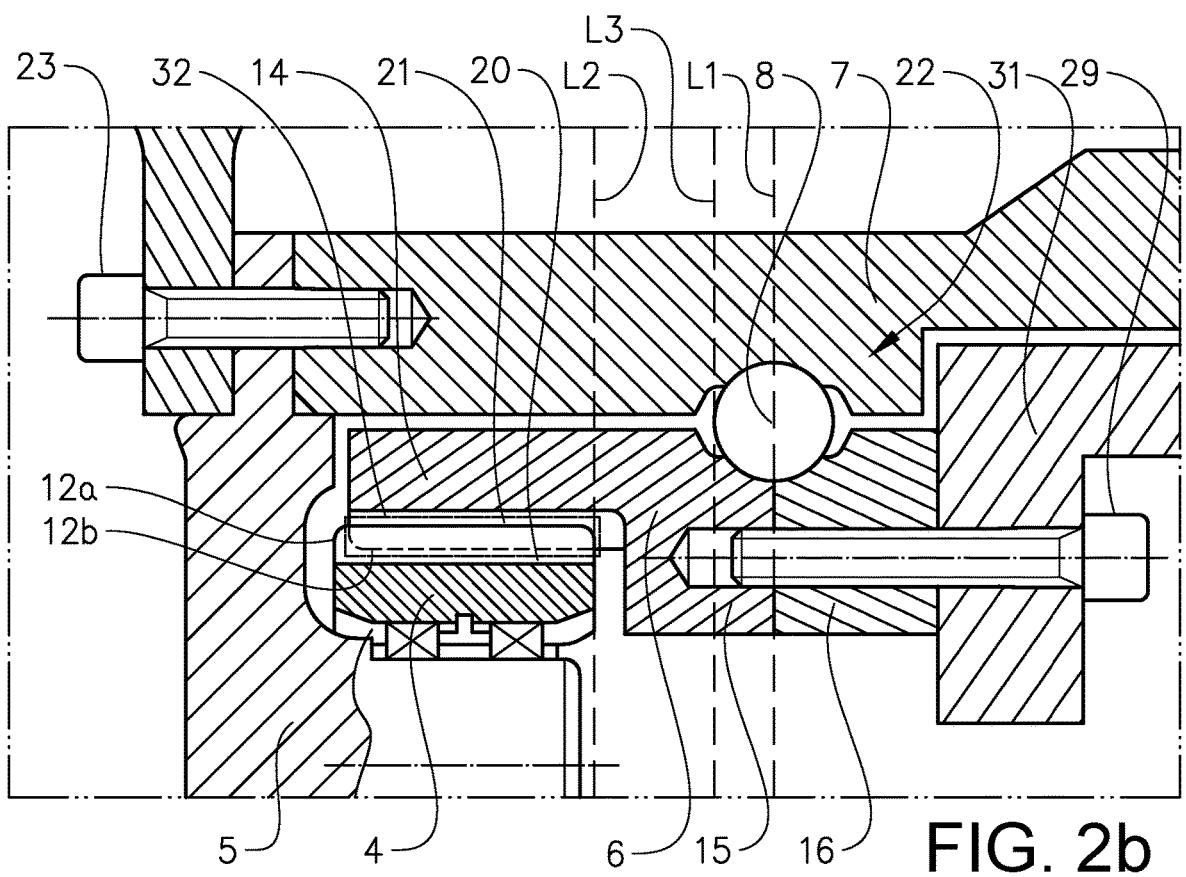
FIG. 2b shows an enlarged portion of the wheel hub unit according to the first embodiment of the present invention.

FIGS. 2a and 2b illustrate a first embodiment of the wheel hub unit 1 of the present invention in greater detail. The wheel hub unit has an axial extension with an outer end 33 and an inner end 34. The outer end 33 is on the side on which a wheel is intended to be fitted to a rim 2 connected to the wheel hub unit 1. The inner end 34 is on the side on which the wheel hub unit 1 is connected to a drive source, which may be either a drive axle of a vehicle, or an electric machine forming a part of the wheel hub unit, and the vehicle.

The wheel hub unit 1 comprises a planetary gear set 10, which comprises a sun gear 3, a set of planet gears, for example four planet gears 4 (of which only two are visible in FIG. 2a), a carrier 5, and a ring gear 6. The carrier 5 holds the planet gears 4. Each of the planet gears 4 of the set of planet gears is provided with engagement means 20 in the form of teeth 12a adapted for engagement with corresponding engagement means 21, of the ring gear 6, which also are in the form of teeth 12b. The engagement area. i.e. the area where the engagement means 20 and the engagement means 21 overlap and engage each other, is denoted 32.

The wheel hub unit 1 also comprises a bearing 22. The bearing comprises an inner bearing ring 6, an outer bearing ring 7 and rolling elements 8. The inner bearing ring 6 constitutes the ring gear 6 of the planetary gear set 10. Hence, the rolling element 8 is in contact with the surface 11 of the inner bearing ring 6, which is directed outwards as seen in the radial direction of the wheel hub unit. The engagement means 21 are provided on the surface 13 of the ring gear 6, which is directed inwards as seen in the radial direction of the wheel hub unit. The engagement means 20, 21 and the bearing 22 are shown in greater detail in FIG. 2b. The carrier 5 is connected to the outer bearing ring 7 through bolts 23. The wheel hub unit 1 is also fixedly connected to a rim 2 for holding any one of the wheels 116, 117, 118 and 119. This connection is established by the rim 2 being connected to the carrier 5 and the outer bearing ring 7 through the bolts 23. The sun gear 3 is connected to a drive shaft 17, which is driven by a non-illustrated drive source. Hence, when the drive shaft 17 and thereby the sun gear 3 rotate, the planet gears 4 and the carrier 5 also rotate. The ring gear 6 is held stationary. As the ring gear 6 also constitutes the inner bearing ring of the bearing 22, the outer bearing ring 7 is free to rotate together with the carrier 5. Thus, the wheel 116, 117, 118, 119 connected to the rim 2 may be driven by the wheel hub unit 1.

As is clear from FIGS. 2a and 2b, the rolling elements 8 of the bearing 22 are axially displaced in relation to the engagement area 32. Hence, a straight radially extending imaginary line L1 which intersects an axial center line 9, which in this embodiment coincides with the axial center of drive shaft 17, of the wheel hub unit 1 perpendiculary and intersects the center of one of said rolling elements 8 is axially displaced in relation to a straight radially extending imaginary line 12 which intersects the axial center line 9 of the wheel hub unit 1 perpendiculary and intersects the portion of the engagement means 20 of said planet gears 4, or the engagement area 32, that is closest to said rolling element 8. In the embodiment illustrated in FIGS. 2a and 2b, the axial displacement is in fact so large that a straight imaginary line L3 that intersects the axial center line 9 of the wheel huh unit 1 perpendiculary and intersects one of said rolling elements 8 at the portion of the rolling element being closest to the engagement means 20 of the planet gears 4, or the engagement area 32, is axially displaced in relation to the straight radially extending imaginary line L2 which intersects the axial center line 9 of the wheel hub unit 1 perpendiculary and intersects the portion of the engagement means 20 of said planet gears 4, or engagement area 32, that is closest to said rolling element 8. Hence, in this embodiment, there is no overlap at all between the engagement area 32 and the rolling elements 8. The ring gear/inner bearing ring 6 may therefore have a sufficiently thickness, and all components still fit within the rim 2. The root diameter D1 of the ring gear 6 is in this embodiment somewhat larger than 95% of the inner raceway diameter D2. However, due to the axial displacement of the engagement area 32 and the rolling elements 8, it is possible to provide for planetary gear sets in which the root diameter of the ring gear is even as large as 110% of the inner raceway diameter D2.

The axial displacement of the engagement area 32 and the rolling elements 8 of the bearing 22 are achieved by means of a flange 14 of the ring gear 6. The engagement means 21 of the ring gear 6 are provided on this flange 14, which extends in the axial direction of said wheel hub unit, and it is thereby possible to provide a meshed engagement with the engagement means 20 of the planet gears 4 that is axially distanced from the rolling elements 8 of the bearing 22.

The axial displacement is such that die rolling elements 8 of the bearing are closer to the center L5 of the rim 2, as seen in the axial direction of the rim, than the engagement area 32. Furthermore, the engagement area 32 is provided closer to an outer end 33, which is the end of the wheel hub unit that is adapted to be connected to a rim for holding a wheel, than said rolling elements 8 of the bearing, as seen in the axial direction of the wheel hub unit. Hence, die rolling elements 8 of the bearing are provided closer to an inner end 34, which is the end of the wheel hub unit that is adapted to be connected to a vehicle, than the engagement area 32.

It can also be seen in FIGS. 2a and 2b that the inner ring 6 of the bearing 22 is a split inner ring. The split inner ring comprises two parts 15, 16 that are held together by bolts 29. The two parts 15, 16 are also connected to a stationary part 31 of the wheel hub unit through the bolts 29. Both parts 15, 16 of the split inner bearing ring 6 are in contact with the rolling elements 8 of the bearing. However, only a first part 15 of the split inner bearing ring constitutes the outer ring 6 of the planetary gear set 10. The first part 15 of the split inner bearing ring, i.e. the part of it that is provided with the flange 14 and the engagement means 21, is provided closer to the outer end 33 than the other part 16 of the split inner bearing ring, as seen in the axial direction of the wheel hub unit.

Figure 3:
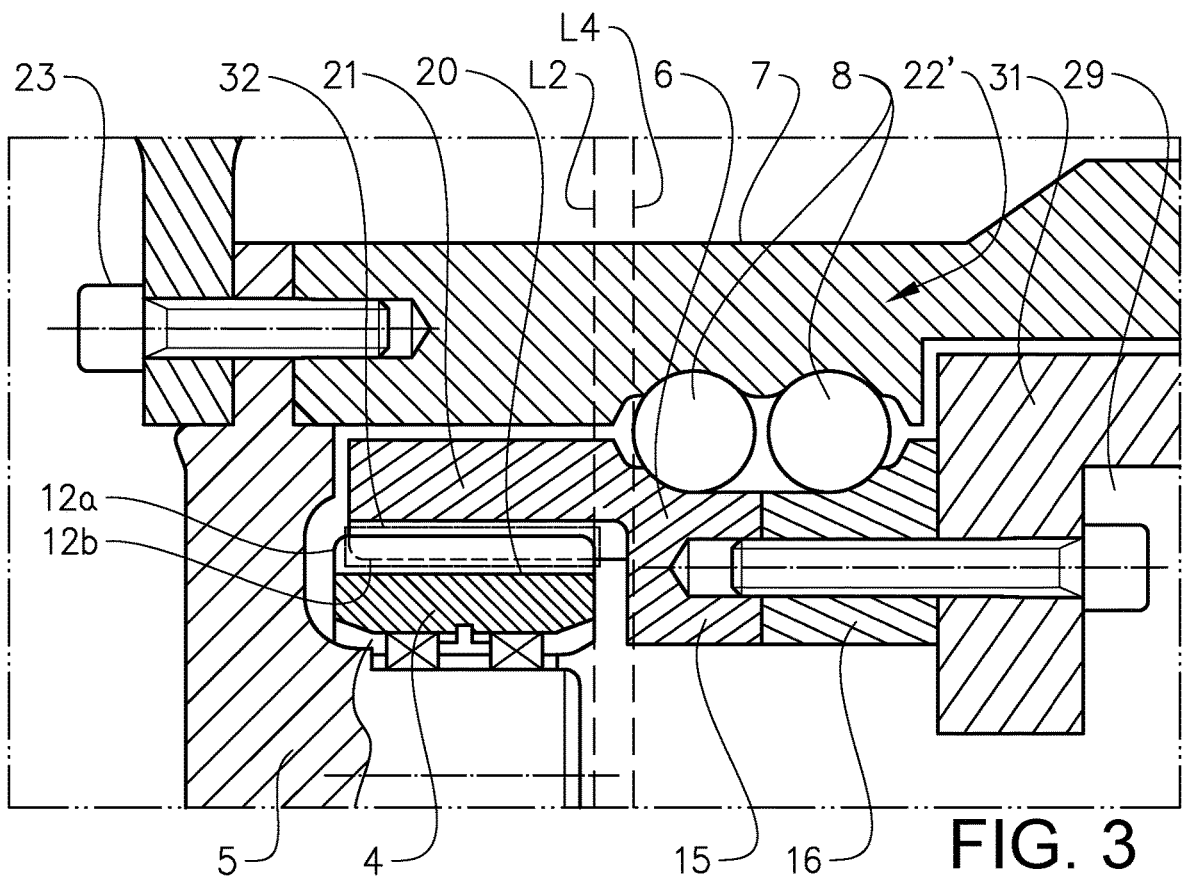
FIG. 3 shows an enlarged portion of a wheel hub unit according to a second embodiment of the present invention, in which the bearing element is double-row bearing element.

Another embodiment of the wheel hub unit 1 according to the present invention is illustrated in FIG. 3. This embodiment has most features in common with the first embodiment, and features being similar will not be elaborated upon. The difference between this embodiment and the first embodiment is that the bearing is a double-row bearing 22 and a straight imaginary line 14 that intersects the axial center line 9 of the wheel hub unit 1 perpendiculary and intersects a rolling element 8 in the row of rolling elements that is closest to the engagement area 32 is axially displaced in relation to the straight radially extending imaginary line L2 which intersects the axial center line 9 of the wheel hub unit 1 perpendicularly and intersects the portion of the engagement area 32 that is closest to said rolling element 8. Hence, in this embodiment, there is an axial displacement between the rolling elements 8 being closest to the engagement area 32, and the engagement area 32. Similarly to the first embodiment, this second embodiment also fulfills the purpose of fitting more and/or larger components into a rim of a specific size.

Figure 4:
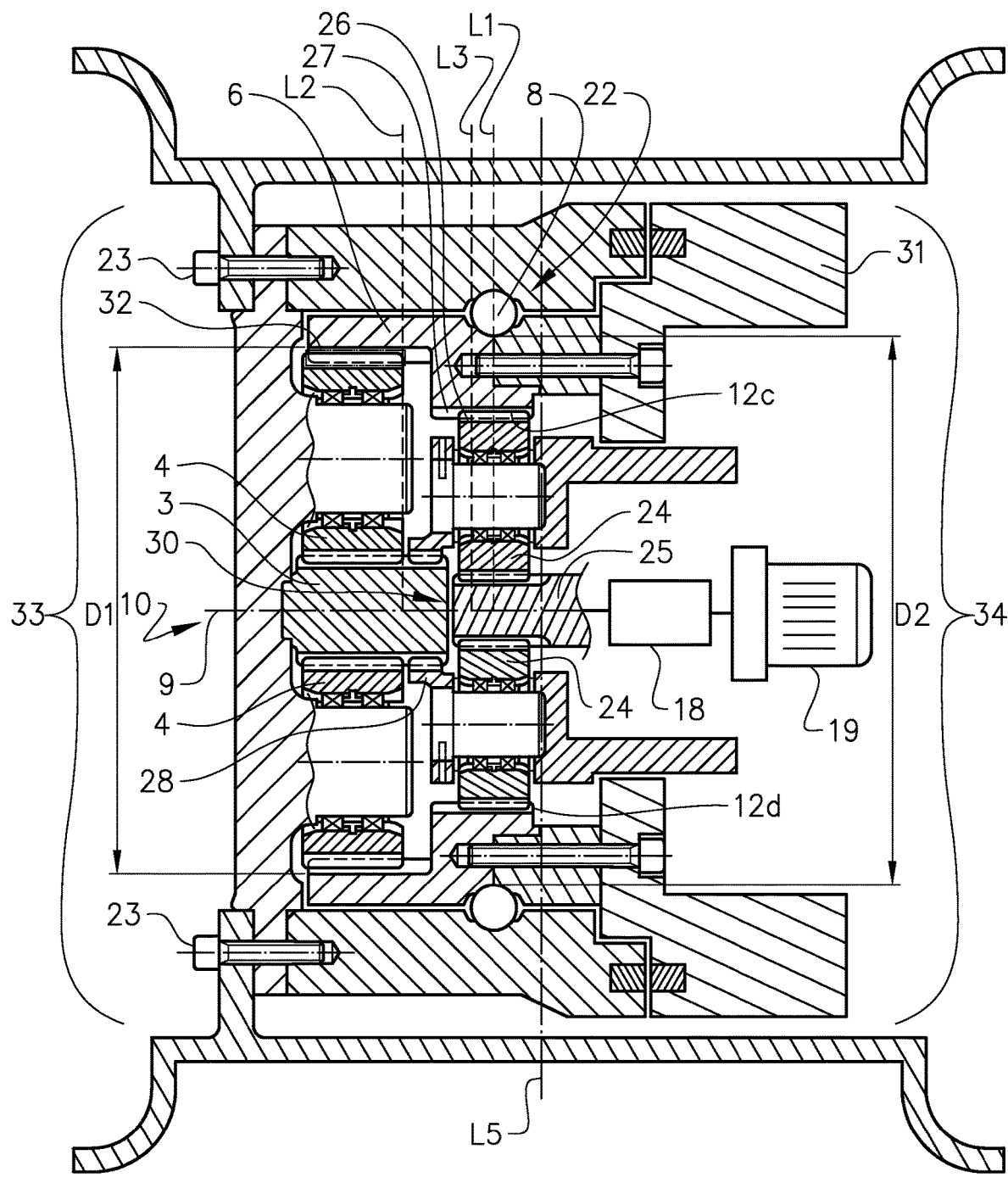
FIG. 4 shows a cut-away cross-sectional view of a wheel hub unit according to a third embodiment of the present invention, in which the wheel hub unit comprises two planetary gear sets, a transmission and an electric motor.

A yet further embodiment of the present invention is illustrated in FIG. 4, which shows a part of a wheel hub unit 1. This embodiment has most features in common with the first and second embodiments, and features being similar will not be elaborated upon. A difference between this embodiment and the first and second embodiment is that in this embodiment, a second planetary gear set 30 comprising a set of planet gears 24, for example four planet gears, (of which only two are shown in FIG. 4), is provided. The planet gears 24 of this second planetary gear set 30 are engaged with, and driven by, a sun gear 25. The sun gear 25 is directly or indirectly connected to a transmission 18 that is driven by a drive source in the form of an electric motor 19. In this embodiment, there is no drive shaft illustrated. Instead, the transmission 18 may comprise e.g. one or more further planetary gear sets. The transmission 18 and electric motor 19 may however be embodied in many different ways and are therefore only schematically illustrated in the drawings. They will also not be further elaborated upon herein.

The ring gear of the second planetary gear set 30 is also formed by the inner bearing ring 6, and similarly to the first planet gears 4, the planet gears 24 are provided with engagement means 26 in the form of teeth 12c that are in meshed engagement with corresponding engagement menus 27 of the ring gear, which are also in the form of teeth 12d.

The first planetary gear set 10 is coupled in series with the second planetary gear set 30. I.a., the planet gears 21 are held by a carrier 28, which is connected to the sun gear 3 of the first planetary gear set 10. Hence, the first planetary gear set 10 is driven by the carrier 28 of the second planetary gear set 30.

As can be seen in FIG. 4, it is sufficient that only one of said at least two planetary gear sets is axially displaced in relation to the rolling elements 8 of the bearing 22 in order to achieve the aim of the present invention. In the illustrated embodiment, it is the first planetary gear set 10 that constitutes the at least one planetary gear set that is axially displaced. It can also be seen that the first planetary gear set 10 has a larger diameter than the second planetary gear set 30. Hence, the second planetary gear set may be provided radially inside the bearing 22 without the wheel hub unit exceeding the radial size limitations of the rim 2.

A person skilled in the art also realizes that the different alternative embodiments and aspects mentioned above may be combined with each other in various suitable embodiments within the scope of the claims.

The means for driving the sun gear of the first planetary gear set has been described as a drive shaft in one embodiment and a non-specified transmission and a second set of planet gears in another embodiment. It is however possible to utilize other means, or combine the illustrated embodiments in different manners. It is also conceivable to drive the drive shaft or the other transmission with any suitable drive source, such as e.g. an electrical drive source, an ICE or a hydraulic drive.

The illustrated planetary gear sets have been described as comprising four planet gears. It is however also conceivable with another number of planet gears in the planetary gear sets.

Furthermore, any reference signs in the claims should not be construed as limiting the scope.

The invention claimed is:

1. A wheel hub unit comprising
at least one planetary gear set comprising a sun gear, one set of planet gears, a carrier, and a ring gear, wherein each of the planet gears of the set of planet gears is provided with planet gear teeth adapted for engagement with corresponding ring gear teeth of the ring gear, wherein the ring gear teeth of the ring gear are directed inwards as seen in the radial direction of the wheel hub unit, wherein the ring gear teeth engage the planet gear teeth at an engagement area in which the planet gear teeth of the planet gears overlap the ring gear teeth of the ring gear,
a bearing, comprising an inner bearing ring, an outer bearing ring and rolling elements,
wherein the inner bearing ring is formed by a surface of the ring gear of the planetary gear set, the surface being directed outwards as seen in the radial direction of the wheel hub unit,
wherein each of the respective rolling elements is in contact with the surface of the inner bearing ring,
wherein a center of each of the respective rolling elements is axially displaced in relation to the engagement area, and
wherein the inner ring of the bearing is a split inner ring comprising two parts, wherein both parts of the split inner bearing ring are in contact with the rolling elements of the bearing.

2. A wheel hub unit according to claim 1, wherein the rolling elements are axially displaced in relation to the engagement area of the planet gear teeth and the ring gear teeth, such that the entire rolling elements are arranged axially outside of the engagement area.

3. A wheel hub unit according to claim 1, wherein the bearing is a double-row bearing.

4. A wheel hub unit according to claim 3, wherein the rolling elements of the double-row bearing are axially displaced in relation to the engagement area of the planet gear teeth and the ring gear teeth, such that both rolling elements in each pair of rolling elements are arranged axially outside of the engagement area.

5. A wheel hub unit according to claim 1, wherein the wheel hub unit has an axial extension, with an inner end being the end that is adapted to be connected to a vehicle, and an outer end being the end that is adapted to be connected to a rim for holding a wheel.

6. A wheel hub unit according to claim 5, wherein the engagement area is provided closer to the outer end than the rolling elements of the bearing, as seen in the axial direction of the wheel hub unit.

7. A wheel hub unit according to claim 5, wherein a first part of the two parts of the split inner bearing ring constitutes the ring gear of the planetary gear set, and wherein the first part of the split inner bearing ring is provided closer to the outer end of the wheel hub unit than the other part of the split inner bearing ring, as seen in the axial direction of the wheel hub unit.

8. A wheel hub unit according to claim 1, wherein the wheel hub unit further comprises an electric machine as a drive source for driving the sun gear.

9. A wheel hub unit according to claim 1, comprising at least two planetary gear sets coupled in series, wherein one of the at least two planetary gear sets constitutes the at least one planetary gear set.

10. A wheel hub unit according to claim 9, wherein the planetary gear set having the largest diameter of the at least two planetary gear sets constitutes the at least one planetary gear set.

11. A wheel hub unit according to claim 1, wherein a root diameter of the ring gear is in the range of 95-110% of an inner raceway diameter of the inner bearing ring.

12. A vehicle comprising a wheel hub unit according to claim 1.

13. A vehicle according to claim 12, wherein the vehicle is a work machine.

14. A vehicle according to claim 12, wherein the wheel hub unit is provided in a rim of the vehicle, and wherein the rolling elements of the bearing are closer to a center of the rim, as seen in the width direction of the rim, than the engagement area.

* * * * *